Sept. 21, 1954  A. LATOUR ET AL  2,689,888
HIGH-VOLTAGE TRANSMISSION LINE
Filed March 6, 1951  3 Sheets-Sheet 1

INVENTORS
ANDRÉ LATOUR
BY  ALBERT VIBOUD

ATTORNEY

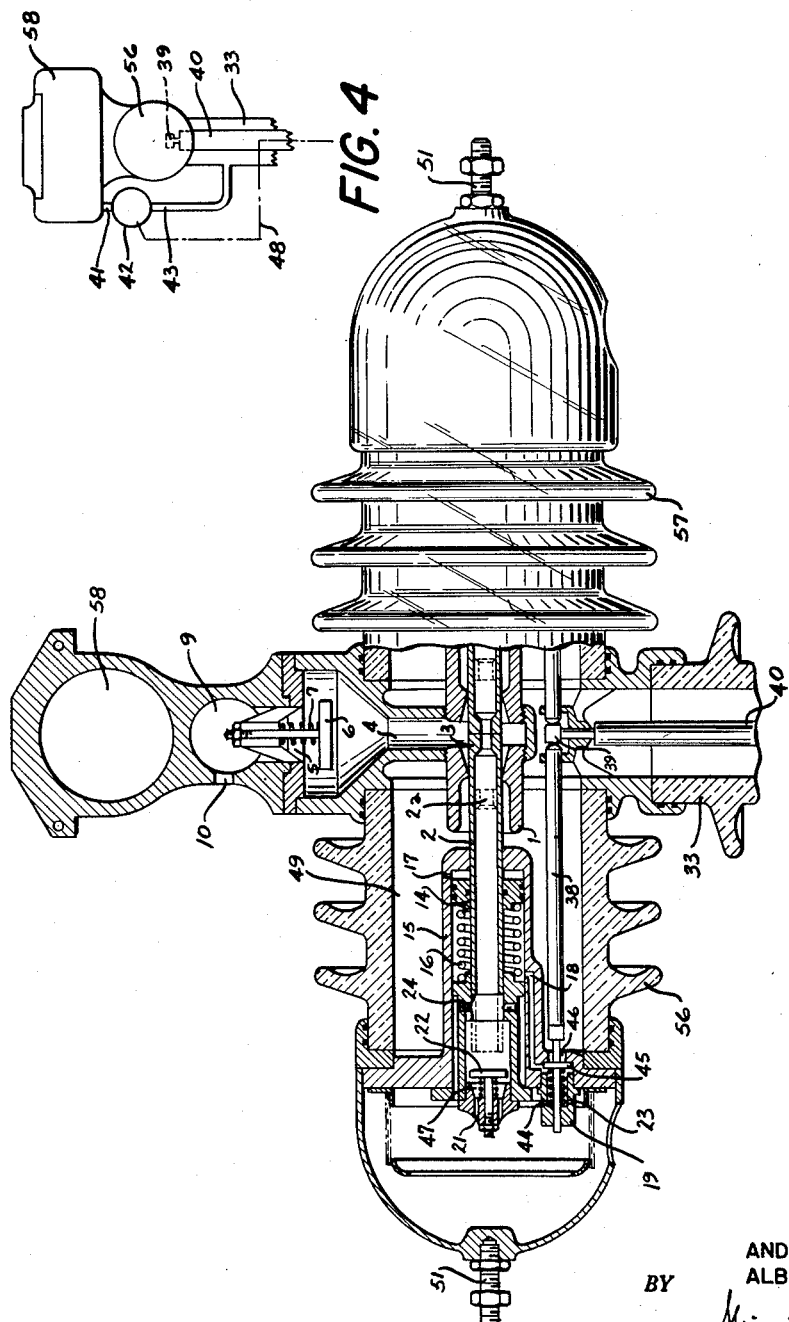

Patented Sept. 21, 1954

2,689,888

UNITED STATES PATENT OFFICE 2,689,888

HIGH-VOLTAGE TRANSMISSION LINE

André Latour and Albert Viboud, Grenoble, France, assignors to The Etablissements Merlin & Gerin (Societe Anonyme), Grenoble, France, a corporation of France Application March 6, 1951, Serial No. 214,047

Claims priority, application France March 10, 1950

10 Claims. (Cl. 200—49)

1

The invention relates to high voltage transmission lines, to high voltage switching and transformer stations and more particularly to air-blast circuit breakers used on these lines or in these stations.

As a rule, circuit breakers of this kind are installed outdoors, in switchyards on the ground. A masonry base of a man's height or so carries high insulating pillars on which the circuit breaker itself is mounted. These pillars which are constructed either as single bushing type insulators or as post insulators built up from several stacked petticoat or cup type insulators represent the weak spot of the whole installation. Moreover, the high bases and the mounting of the circuit breakers on the ground obstruct easy surveying of the switchyards, are contrary to clear arrangement and prevent an economical wiring of the switchyards.

A circuit breaker of the aforesaid kind is generally associated with an insulating switch which in most cases is integral with it and the operation of which is synchronized with that of the circuit breaker. Moreover, a sectionalizing switch or interrupter is provided on each side of the circuit breaker for the purpose of insulating the circuit breaker, should inspection or repair become necessary.

It is thus an object of the invention to simplify the ground arrangement of the control and other apparatus and the ground lay-out of the switch yard in general, furthermore, to avoid leading the high tension lines from the overhead lines down to the ground.

These and other objects of the invention are achieved when, in accordance with the invention, the circuit breaker is suspended from the metallic tower structure of the line or the switch yard. Any masonry base and the post insulators bearing the circuit breaker may thus be dispensed with.

Moreover, the invention contemplates a suspension of the circuit breaker from the tower such that no undue mechanical stresses are transmitted from the suspension of the circuit breaker to any of the suspensions of the two line sections and vice versa, so that each of the three components, the two line sections and the circuit breaker, may be subjected to mechanical strains caused by the prevailing particular conditions such as the tension under which the respective component is suspended, or by atmospheric conditions such as temperature, wind, snow, ice, thunderstorm, or the like, without the risk that any of the other components might be adversely affected.

This object is achieved by the arrangement of the air-blast circuit breaker at the tower, by means of suspension insulators secured to the tower and to the circuit breaker separately from and independently of those suspension insulators which secure to the tower the ends of the adjoining line sections, the air-blast circuit breaker thus being suspended at the tower fully independent of the suspension of the line sections.

Connectors, electrically connect the circuit breaker in series between the line sections and since these connectors are untensioned and more or less flexible, no tensional components are deviated into and through these connectors. The connectors thus are free from and secure against any stresses through the suspension forces or mechanical tensions which otherwise might endanger the electrical connection between the one line section, the circuit breaker, and the other line section.

Another object of the invention is to eliminate the insulating switch integral with the circuit breaker so as to simplify the suspension problem.

Still another object of the invention is the provision of a circuit breaker mounted in such a way that the straightness of the transmission line is not noticeably interrupted and thus its sightliness not disturbed, as otherwise is the case with circuit breakers mounted on a ground base and which therefore are considerably lower than the line level. The mounting of the circuit breaker in accordance with the invention also simplifies the problems created by surge waves circulating on the lines.

In the accompanying drawings:

Fig. 3 is a schematical elevation partly in section of an air-blast circuit breaker with two symmetrically arranged arc-extinction chambers; and Fig. 4 is a rather diagrammatic side view of the circuit breaker on a reduced scale;

Figures 1, 2:
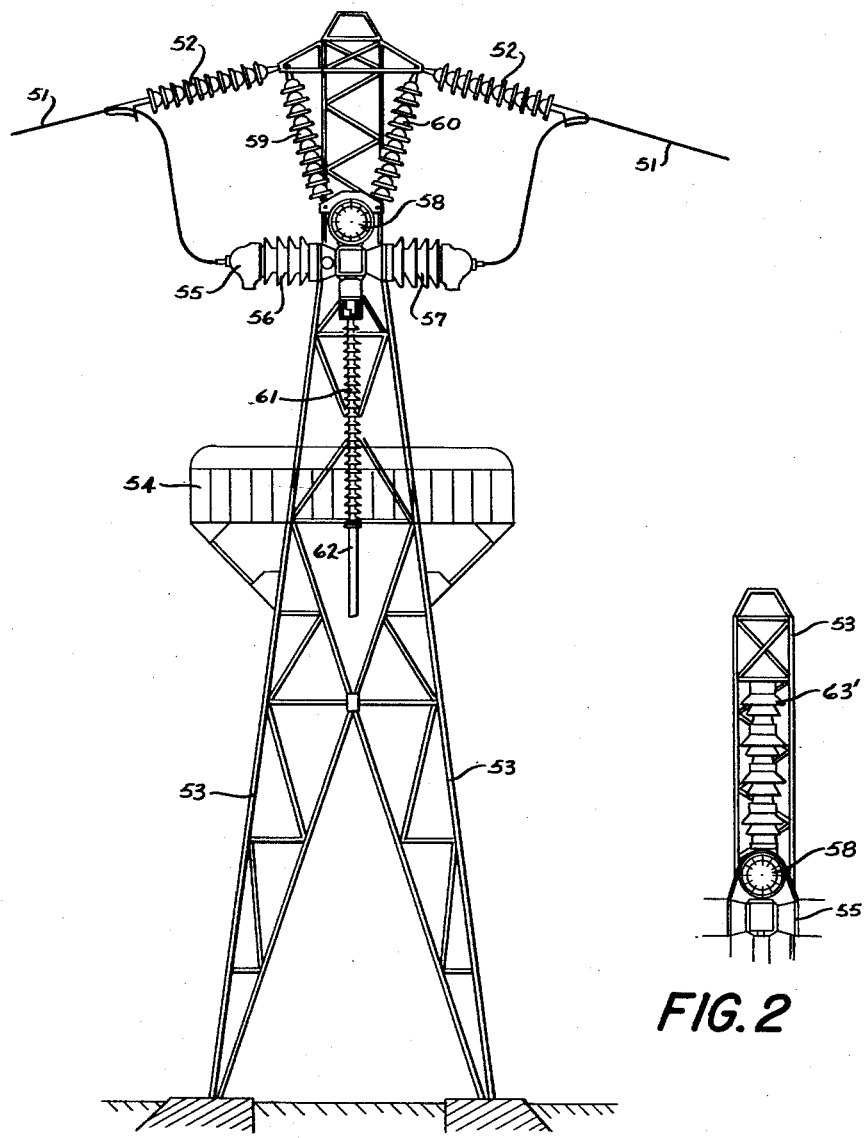
Fig. 1 is an elevation of a line tower with an air-blast circuit breaker with two horizontal arc-extinction chambers suspended from the tower by means of two flexible suspension strings.
Fig. 2 is an elevation of a modification of the upper part of the tower with an air-blast circuit breaker suspended from the tower by a rigid suspension string.

In the drawings, 51 is the high voltage transmission line carried by the dead end strings 52 fixed on the tower 53. 54 is an inspection platform. Between the dead ends of the line 51 there is inserted the air-blast circuit breaker 55 comprising two horizontal arc-extinction chambers 56 and 57 symmetrically arranged with reference to a median vertical plane of the circuit breaker. The two extinguishing chambers are identical but symmetrically arranged, only one having been shown in section.

The fixed contact of the circuit breaker is designated by 1 and is in the form of a nozzle. 2 is the movable tubular contact. Orifice 3 of the nozzle contact 1 opens into a chamber 4 called exhaust chamber.

In the closed position of the circuit breaker, as illustrated in Fig. 3, exhaust chamber 4 communicates with the open air through a passage 5, the space 9 and opening 10. Passage 5 is controlled by a valve 6 under tension of spring 7 and is thus held open. The movable tubular contact 2 is actuated by a piston 14 secured to it and reciprocatable in a cylinder 15.

In the closed position of the tubular contact 2, as illustrated, the cylinder space on the left hand side of the piston 14 is under atmospheric pressure by the intermediary of duct 18 and openings 44, valve 45 of a distributor 19 being urged by spring 23 into its right hand position on its seat where it closes a passage 46 to the space 49. The cylinder space on the right hand side of the piston communicates permanently through the holes 17 provided in the wall of cylinder 15 with the space 49 of the arc-extinction chamber 56.

In the closed position of the tubular contact 2, its interior likewise communicates with the open atmosphere through the passages 24 on the one hand and the orifices 21 of the valve 22 on the other hand, this valve being urged into its open position by spring 47.

A pressure medium, compressed air or a compressed gas, may also be admitted into the arc-extinction chamber 56 from the receiver 58 over valve 42 and lines 41 and 43, Fig. 4.

Valve 42 is actuated by a remote-control line operated pneumatically or hydraulically and diagrammatically indicated at 48. The remote-control line leads to the ground by means of the insulating tube 61 which may be e. g. a porcelain tube of sufficient length provided with a proper number of petticoats according to the rated line voltage. This tube is destined to insulate the control apparatus from the circuit breaker, all parts of which are live. The tube 61 is continued by a normal flexible or rigid tube 62 leading to the control panel 63 on the ground.

When by actuation of valve 42 pressure is admitted to the arc-extinction chamber 56, this pressure will enter through the holes 17 the right hand space of cylinder 15 and will shift piston 14 to the left against the tension of the spring 16. The contact 2 parts from the fixed contact 1 and closes the passages 24. The pressure will now drive a part of the ionized gases of the breaking arc on one hand into the tubular contact 2, from where they will exhaust into the open atmosphere by the duct 21 before the valve 22 is pressed on its seat. This valve is so designed as not to close immediately when subjected to the pressure of the extinguishing medium but a short time later, when the ionized gases have exhausted into the atmosphere. The open position of contact member 2 is indicated by broken lines and the numeral 2a.

In a similar manner the remaining part of the ionized gases will be carried by the compressed air through the nozzle contact which now gives free passage, as contact 2 has moved towards the left hand side, into the exhaust chamber 4 and from there into the open air. Here too, the valve 6 is so designed as to close in spite of the pressure of the extinguishing medium after a short period, however long enough to allow the ionized gases to leave the exhaust chamber through the passage 5.

During this process valve 45 is pressed by the spring 23 on its right seat so that the left hand side of piston 14 is under atmospheric pressure due to the duct 18 and the apertures 44.

When the valves 22 and 6 are pressed on their seat the interior of chamber 56 and the exhaust chamber 4 are under full pressure and contacts 1 and 2 are maintained separated and the circuit breaker open as long as this pressure subsists.

In order to close the circuit breaker, shaft 40 remote-controlled from the ground is actuated by the closing device of the circuit breaker. The shaft shifts by its cam 39 the push-rod 38 to the left, thereby raises valve 45 from its right seat and presses it against its left seat. In doing so, the duct 18 is closed towards the atmosphere and the pressure, still at its full value in space 49, enters through passage 46 and duct 18 the left hand side space of cylinder 15. Now the piston 14 is exposed on its both sides to the same pressure, which allows spring 16 to shift the piston 14 and with it the contact 2 towards the right hand side. The contact during this movement uncovers the passages 24 leading to the open air whereupon the pressure falls rapidly to atmospheric pressure as the compressed air supply valve 42, equally remote-controlled, has been closed by the closing-device of the circuit breaker at the same time as the shaft 40 has been actuated. The exhaust of pressure is still accelerated by the action of the springs 7 and 47 which urge the valves 6 and 22 into open position as soon as the compressed air begins to exhaust through passages 24. The whole circuit breaker system thus is again under atmospheric pressure whilst the tubular contact is held closed under the tension of the spring 16.

All the parts mentioned hereinabove as located in the arc-extinction chamber 56 are identically contained in the chamber 57. Both chambers constitute the circuit breaker 55 as shown in Figs. 3 and 1.

It will be appreciated that the circuit breaker may consist of a single arc-extinction chamber when the fixed contacts are suppressed and the movable contacts so arranged as to co-operate when butting against each other or parting from each other.

As to further details of the internal structure and the mode of operation of the circuit breaker which in itself does not form part of this invention, reference is made to the co-pending applications Serial Nos. 723,726 and 763,024, respectively filed on January 23, 1947, and July 23, 1947, by André Latour.

The receiver 58 for the pressure medium in close proximity to the arc-extinction chambers 56 and 57 is arranged symmetrically to their common vertical median plane and is formed as an integral unit with the arc-extinction chambers. This receiver supplies the pressure medium for the opening of the contact, for the extinction of the breaking arc and for the closure of the contacts. The receiver is carried by two flexible suspension strings 59, 60, attached to the line tower.

Fig. 2 shows another embodiment of the present invention according to which the circuit breaker 55 by intermediary of its receiver 58 is suspended to the line tower 53 by a rigid string 63' made up of stacked insulators.

In the usual installations, the air-blast circuit breaker is integral with an insulating switch, the operation of which is synchronized in a known manner with that of the circuit breaker.

Figure 5:
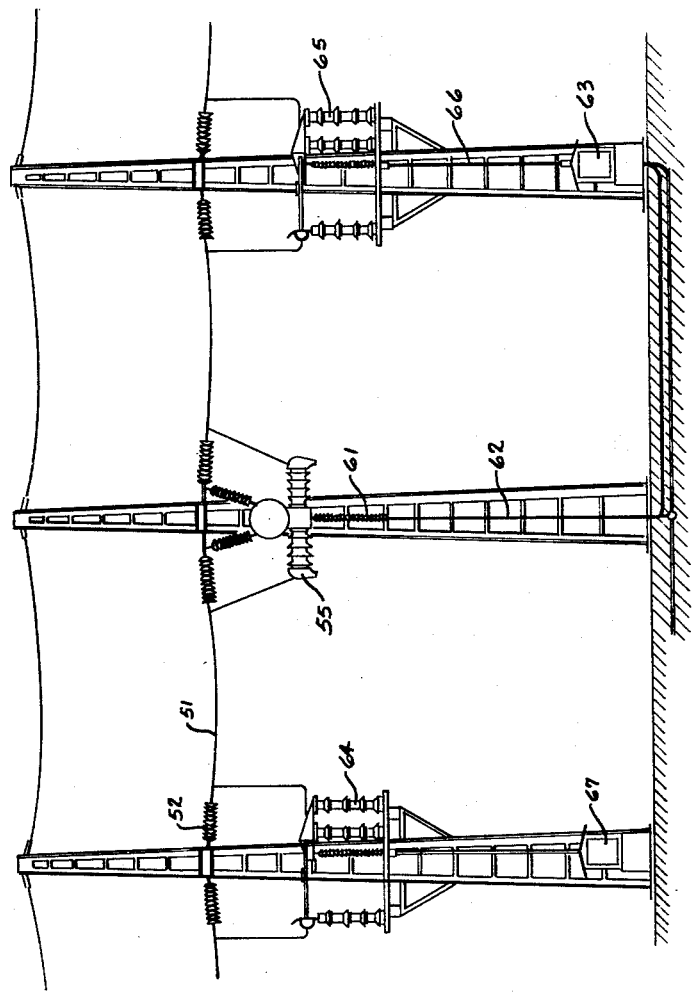
Fig. 5 is a schematical view of the arrangement of a suspended air-blast circuit breaker and of the sectionalizing interrupters destined to insulate the latter.

The present invention makes possible to suppress this insulating switch at the circuit breaker and to provide instead two separate interrupter switches 64 and 65, as shown in Fig. 5, on both sides of the circuit breaker 55 at almost the same level. To this purpose, the neighbouring line towers are provided with proper platforms. Ever according to whether the high voltage line is an end line or a loop, one or both of the interrupting switches 64 and 65 may be synchronized with the circuit breaker 55. In Fig. 5, the high voltage line is supposed to be an end line. Accordingly, only the interrupter switch 65 is synchronized with the circuit breaker 55 by intermediary of the control panel 63 and the actuating shaft 66. The insulating switch 64 is controlled individually by the control panel 67.

The mechanisms for the synchronization of the insulating switches and the circuit breaker as well as the remote control mechanisms for both are known by prior art and therefore are not described in detail.

We claim:

1. In a sectionalizing system for overhead electric lines, the suspension at a line tower of an air-blast circuit breaker connected by means of electric connectors in series between two adjoining line sections suspended at their terminals from the tower by means of suspension insulators; said suspension comprising separate suspension insulators for said circuit breaker secured at the tower at a nodal point on the tower side of the suspension system of said line sections, separate therefrom and independent thereof; said electric connectors connecting the terminals of the circuit breaker with the terminals of the line sections where said line section terminals are secured to their suspension insulators thus flexibly bridging both suspensions of the circuit breaker and of the line sections; circuit breaker suspension and suspension system of the line sections thus being non-rigidly and yieldably connected to each other and transmission of externally produced stresses from either line section to circuit breaker and vice versa being prevented.

2. Sectionalizing system as set forth in claim 1 wherein said air-blast circuit breaker is of a configuration having a longitudinal symmetry axis and a vertical symmetry plane perpendicular thereto and is suspended at the tower symmetrically of said symmetry plane.

3. Sectionalizing system as set forth in claim 2 wherein said circuit breaker is suspended from the suspension points of said line sections at said tower.

4. Sectionalizing system as set forth in claim 1 wherein said air-blast circuit breaker is of a configuration having a longitudinal symmetry axis and a vertical symmetry plane perpendicular thereto and is suspended in close proximity to the suspension points of said line sections at the tower and symmetrically of said vertical symmetry plane.

5. In a sectionalizing system for overhead electric lines, the suspension at a line tower of an air-blast circuit breaker connected by means of electric connectors in series between two adjoining line sections suspended at their terminals from the tower by means of suspension insulators; said suspension comprising separate suspension insulators for said circuit breaker secured at the tower at a nodal point on the tower side of the suspension system of said line sections, separate therefrom and independent thereof; said electric connectors connecting the terminals of the circuit breaker with the terminals of the line sections where said line section terminals are secured to their suspension insulators thus flexibly bridging both suspensions of the circuit breaker and of the line sections; said air-blast circuit breaker being of a configuration having a longitudinal symmetry axis and a vertical symmetry plane perpendicular thereto, conduit means being disposed about said symmetry plane and connecting a source of pressure fluid to said circuit breaker for operating the same; circuit breaker suspension and suspension system of the line sections thus being non-rigidly and yieldably connected to each other and transmission of externally produced stresses from either line section to circuit breaker and vice versa being prevented.

6. Sectionalizing system as set forth in claim 5 wherein a receiver for said pressure fluid is arranged in the immediate vicinity of said circuit breaker and symmetrically with respect to said vertical symmetry plane, said conduit means connecting said receiver with the circuit breaker, and wherein said circuit breaker is suspended from said tower by means of said receiver and symmetrically of said symmetry plane, thereby to suspend said circuit breaker in stabile equilibrium.

7. Sectionalizing system as set forth in claim 6 wherein said circuit breaker comprises two arc extinction chambers arranged about said longitudinal symmetry axis and symmetrically with respect to said vertical symmetry plane, said conduit means connecting said receiver with said chambers.

8. Sectionalizing system as set forth in claim 5 wherein remote control means leading to the ground are associated with and disposed at said circuit breaker, generally about said vertical symmetry plane, thereby to operate the circuit breaker from a distance.

9. Sectionalizing system as set forth in claim 5 wherein a receiver for said pressure fluid is arranged in the immediate vicinity of said circuit breaker and symmetrically with respect to said vertical symmetry plane, said conduit means connecting said receiver with the circuit breaker; said circuit breaker being suspended from said tower by means of said receiver and symmetrically of said symmetry plane; and wherein remote control means are associated with said receiver and with said circuit breaker and disposed at the circuit breaker, generally about said vertical symmetry plane; said control means leading from said receiver and said circuit breaker to the ground and being operable therefrom.

10. Sectionalizing system as set forth in claim 9 wherein said control means include pressure responsive elements associated with the movable contact of said circuit breaker, thereby to operate the circuit breaker.

References Cited in the file of this patent

UNITED STATES PATENTS

| Number | Name | Date |
|---|---|---|
| 1,610,512 | Golladay | Dec. 14, 1926 |
| 1,821,167 | Koppitz | Sept. 1, 1931 |

FOREIGN PATENTS

| Number | Country | Date |
|---|---|---|
| 866,412 | France | May 12, 1941 |